G. R. FORSYTH.
Churn Dasher.
No. 62,124.
Patented Feb. 19, 1867.
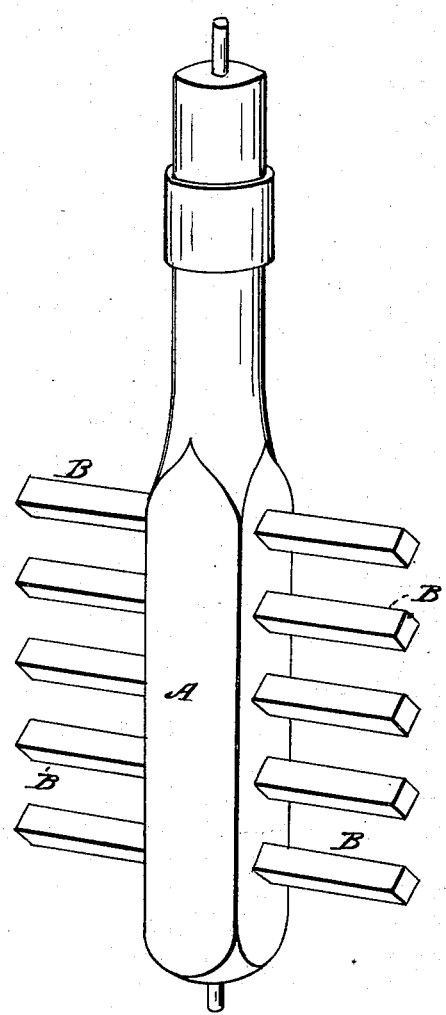

United States Patent Office.

G. R. FORSYTH, OF PEMBERTON, OHIO.

Letters Patent No. 62,124, dated February 19, 1867.

IMPROVEMENT IN CHURN DASHER.

*The Schedule referred to in these Letters Patent and making part of the same.*

TO ALL WHOM IT MAY CONCERN:

Be it known that I, G. R. FORSYTH, of Pemberton, in the county of Shelby, and State of Ohio, have invented a new and improved Churn Dasher; and I do hereby declare the following to be a full, clear, and exact description thereof, reference being had to the annexed perspective drawing, making part of this specification.

The nature of my invention consists in so constructing the agitating arms of my dasher, and so combining them with the shaft by which they are operated, as that the cream shall be so broken and cut as to allow the greatest amount of air to mingle with it, thereby shortening the time required to produce butter, as made in churns now generally used, while the form of the dasher is such as to give the least trouble in cleaning it.

In the drawing, A is the vertical shaft of the dasher, fitted with spindles at each end, the lower one of which is received in a step fitted for it in the centre of the bottom of the churn tub. The shaft A is square for a portion of its length, in order that its angles may aid in disturbing the cream as it revolves. Through the square portion of the shaft are mortised square arms, B B, of a uniform size, placed parallel with each other, and in the same vertical plane, and extending from the centre of the shaft in each direction a distance nearly equal to the radius of the vessel within which they revolve. The manner in which they are secured to the shaft, being set with the diagonals of their cross-sections vertical and horizontal, is distinctly shown in the drawing. Their number depends on the size of the vessel they are used in, and the distance between the ends of their vertical diagonals is about equal to the length of their diagonals. It will be seen that as the dasher is made to revolve, its arms B constantly present to the cream two inclined planes, along which, upward and downward, the cream is forced at angles of forty-five degrees above and below the horizon. As the cream, thus separated, meets again on the back of the arm, its particles cross each other in their agitation, and are operated on again in the same manner by the opposite end of the arm. The cream being thick, and offering considerable resistance by friction around the inside of the churn, is not carried around in one whirl, as water would be, but is broken into innumerable small eddies, each of which presents an opening, into the vacuum of which the air will fall, to become mingled with the cream; and as the cream grows thicker, and offers more and more resistance to the arms B, the more effectual will be the introduction of air among its particles, until butter is produced.

Having thus fully described my invention, what I claim as new therein, and desire to secure by Letters Patent, is—

A revolving churn dasher, constructed, arranged, and operating substantially as described.

The above specification of my improved churn dasher signed by me this 11th day of December, 1866.

G. R. FORSYTH.

Witnesses:
    E. B. HAMER,
    M. R. FORSYTH.